Patented Feb. 17, 1953

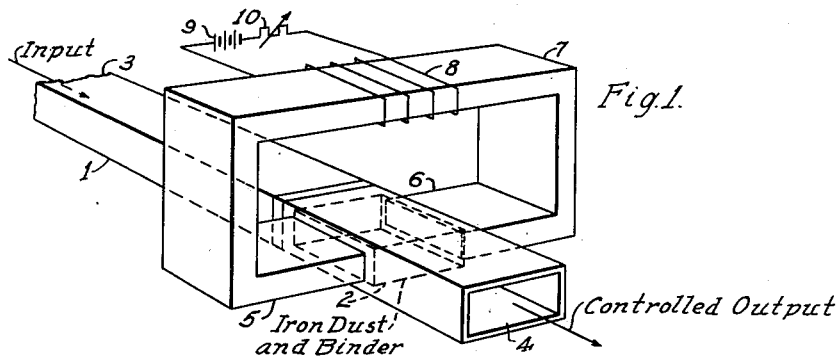
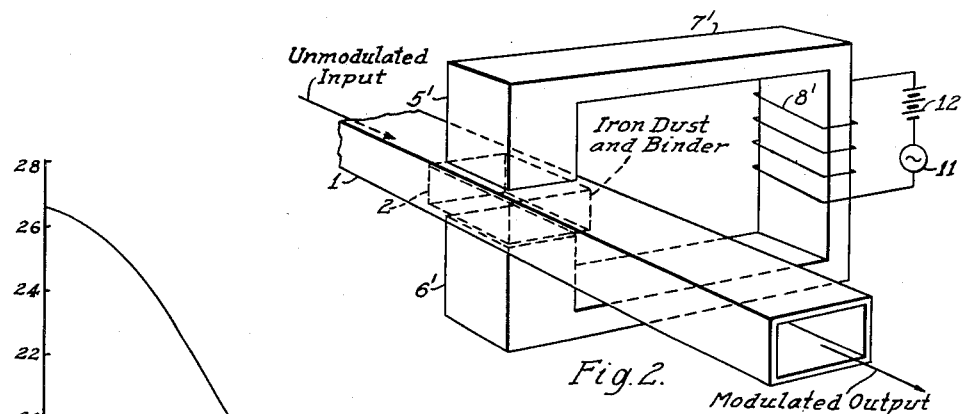
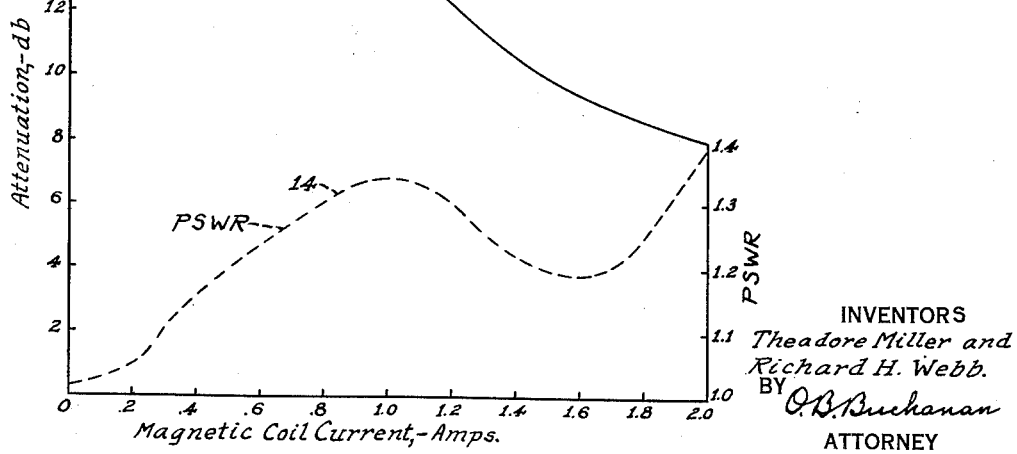

2,629,079

UNITED STATES PATENT OFFICE 2,629,079

WAVE-GUIDE ATTENUATOR AND MODULATOR

Theadore Miller and Richard H. Webb, Pittsburgh, Pa., assignors, by mesne assignments, to the United States of America as represented by the Secretary of the Navy Application January 30, 1948, Serial No. 5,416

4 Claims. (Cl. 332—51)

Our invention relates to a novel attenuation-means and modulation-means for wave guides and other transmission lines of a type having a space through which an electromagnetic wave is propagated.

Heretofore, variable attenuation has usually been accomplished by physically varying the extent of the attenuating space or of the attenuating material in the path of a radiant-energy wave. The mechanical means for accomplishing such variable attenuation is not only cumbersome, and distinctly limited as to the possible rate of change of the attenuation, but it requires machine-work of very high precision. Certain electrically controlled attenuators have been proposed heretofore, in which an effort has been made to change the resistivity of a wave-guide wall-material by variable electrical means, but such means have been limited in effect, because they were not directly operative within the cross section of the space through which the wave is being propagated.

In the field of radio-wave modulation, the standard modulation-method has been to so control the radio-frequency source as to vary the amplitude of its output at a desired modulating frequency. It has also been known to cyclically vary the attenuation interposed by a mechanically moving attenuator, such as a rotating disc with slots cut in it; and it has been further known to place a crystal in a wave guide, and to impress the terminals of the crystal with a voltage of the modulating frequency, so as to make the crystal operate as an attenuator having an attenuation-constant which is cyclically varied at the modulator-frequency rate. Such crystals have had the disadvantage, however, of being somewhat unstable in their operation, so that they have not been practicably usable as any sort of calibrated variable attenuator and the modulated attenuation achieved by such crystals has not always been precisely reliable as to magnitude or phase, in many instances.

It is an object of our present invention to provide a new sort of means, which is useful as an accurately and quickly variable attenuator, involving no mechanically moving parts, and which is also applicable as a modulator which is introduced into a wave guide or other transmission line.

A more specific object of our invention is to provide a variable attenuator or modulator in the form of a block which is composed of a dust of a magnetizable material and a dielectric binder, with electric-circuit control-means including a coil for causing a variable or controllable or modulated magnetic field to pass through said block, said block being included within a wave guide, so as to substantially fill the inside thereof, or, in general, so as to substantially fill the cross-section of the space through which an electromagnetic wave is being propagated.

With the foregoing and other objects in view, our invention consists in the circuits, systems, apparatus, combinations, parts, and methods of design and operation, hereinafter described and claimed, and illustrated in the accompanying drawing, wherein:

Figs. 1 and 2 are diagrammatic perspective views of two different forms of embodiment of our invention, and Fig. 3 is a curve-diagram illustrative of the operation.

A wave guide is shown at 1. In the usual case, the wave guide will be transmitting in the $TE_{01}$ mode, and our invention will be explained on such an assumption, although the invention is not altogether limited to this particular mode of transmission. Our variable attenuator consists of a special kind of block 2 which substantially fills the wave guide 1, or in the general case of any transmission line, which substantially fills the cross-sectional area of the space through which the electromagnetic wave is being propagated, at some point or region between the input-end 3 and the output-end 4 of the wave guide or other transmission line.

This attenuator-block 2 consists of a dust, or finely divided particles, of a magnetizable material, held together by a dielectric binder. The precise materials of the block 2, the fineness of the dust-particles, and the relative proportions, are all subject to considerable variation. For example, in one instance, we have used 0.61 ounce of iron powder, embedded in a matrix of 0.18 ounce of polystyrene dust, the two materials being thoroughly mixed, heated to approximately 100° C., cooled at 3000 pounds pressure, and then cut to the desired shape. In another instance, about 0.18 ounce of polystyrene was dissolved in 50 cc. of toluene, and 1.2 ounces of iron powder was added, these ingredients having been thoroughly mixed together, then spread on a plate and dried at a temperature of 100° C., then crushed, inserted into a pressure-mold, exposed to a temperature of 150° C. in order to melt the polystyrene, and allowed to cool at a pressure of 3000 pounds per square inch, after which the ingot was removed and cut into the desired shape. In another instance, Lucite was used as the insulating plastic.

In accordance with our invention, an electrically variable magnetic field is passed through the attenuator-block 2 which has just been described. In the form of our invention which is shown in Fig. 1, the flux-lines of the magnetic field are perpendicular to the electric component of the electromagnetic wave, these flux-lines being produced between the poles 5 and 6 of an electromagnet 7 which is disposed externally of the wave guide, and which is energized by a coil 8 excited from a battery 9 and a variable resistor 10. In the form of our invention which is shown in Fig. 2, the flux-lines of the magnetic field are parallel to the electric component of the electromagnetic wave traveling through the guide, these flux-lines being produced by the poles 5' and 6' of an electromagnet 7' which is excited by a coil 8' energized from a modulator-frequency source 11, in a circuit which may, or may not, include a biasing battery 12 for controlling the part of the response-curve which is effective.

In operation, while we do not wish to be limited to any particular theory of operation, it is believed that the magnetic field orients the molecular or crystalline dipoles of the iron dust-particles or crystals, more or less in the direction of the field, and varies the effective permeability of the iron powder. This variation of the permeability varies the eddy-current losses, at the microwave frequencies, and thus a controllable attenuation is achieved. Such control is obtainable whether the direction of orientation is perpendicular to the electric component of the electromagnetic wave, that is, perpendicular to the vertical direction, with the wave guide lying as shown in Fig. 1, or whether the orientation is parallel to the electric component of the wave, as shown in Fig. 2. The effects vary with different materials, sometimes increasing the losses, sometimes decreasing the losses, sometimes dependent upon the direction of orientation, and sometimes not so dependent.

The operation of our system will perhaps better be understood with reference to the experimental curves which are shown in Fig. 3. In Fig. 3, the attenuation-curve 13 shows the attenuation, in decibels, for different values of the current through the exciting-coil 8 in Fig. 1, while the power standing-wave ratio-curve 14 shows the corresponding value in the power standing-wave ratio PSWR. This power standing-wave ratio is the square of the voltage standing-wave ratio. If $P_i$ and $P_r$ are the respective power-levels of the incident wave and the reflected wave in the wave guide, the power standing-wave ratio will be given by the following formula:

$$PSWR = \left( \frac{\sqrt{P_i} + \sqrt{P_r}}{\sqrt{P_i} - \sqrt{P_r}} \right)^2$$

The fact that the power standing-wave ratio PSWR does not exceed 1.4, as shown in Fig. 3, shows that the system remains fairly well matched, for all values of attenuation tested.

It will thus be evident that the radiant-energy wave which enters the wave guide 1 at the entrance 3 passes through the attenuator 2, and thence on to the load-end 4. The energy which is received at the load-end 4 can thus be varied by varying the field-strength of the electromagnet 7 or 7', as the case may be. When a cyclic variation is applied to the magnetic field-strength, as by means of a modulation-frequency alternating-current generator 11, it would be possible to permit the magnetic field to cyclically or periodically reverse in direction, although, in other cases, as suggested in Fig. 2, a biasing battery 12 can be used for biasing the magnetic field toward a point corresponding approximately to the center of the approximately straight-line portion of the attenuation-curve 13 in Fig. 3, so that the modulator 11 will vary the attenuation up and down on this straight-line portion.

While we have illustrated our invention in only two alternative forms of embodiment, and while we have described its principles more particularly in connection with a wave-guide form of transmission line, we are not altogether limited in these particulars, as has been intimated hereinabove, and we desire that the appended claims shall be accorded the broadest construction consistent with their language.

We claim as our invention:

1. In combination, a wave guide having an input end and an output end, and a variable attenuator directly in the wave guide at an intermediate point between said input end and said output end, said variable attenuator comprising a block disposed inside of said wave guide and substantially filling said inside, an electromagnet core disposed outside of said wave guide and having poles on opposite sides of said block so as to include said block in its magnetic circuit, an exciting coil for said electromagnet core, and means for controllably energizing said coil, said block being composed of a dust of a magnetizable material and a solid dielectric binder holding said dust fixed immovably against any translation.

2. The invention as defined in claim 1, characterized by said wave guide being adapted to transmit energy in the $TE_{01}$ mode, and the path of the magnetic lines of force through said block being perpendicular to the electric component of the electromagnetic wave.

3. A wave-guide modulator as defined in claim 1, characterized by said coil-energizing means including a source of modulating frequency, whereby the output of the wave guide is of the input frequency, modulated in accordance with said modulating frequency.

4. In combination, a wave guide having an input end and an output end, and a variable attenuator directly in the wave guide at an intermediate point between said input end and said output end, said variable attenuator comprising a block disposed inside of said wave guide in a region of high field intensity, an electromagnet core disposed outside of said wave guide and having poles on opposite sides of said block so as to include said block in its magnetic circuit, an exciting coil for said electromagnet core, and means for controllably energizing said coil, said block being composed of a dust of a magnetizable material immovably embedded in a solid dielectric binder so that the particles of said dust are substantially prevented from changing their physical orientation but change the orientation of their molecular or crystalline dipoles in response to changes in the field produced by said electromagnet core.

THEODORE MILLER.
RICHARD H. WEBB.

REFERENCES CITED

The following references are of record in the file of this patent:

UNITED STATES PATENTS

| Number | Name | Date |
| --- | --- | --- |
| 2,197,122 | Bowen | Apr. 16, 1940 |
| 2,197,123 | King | Apr. 16, 1940 |
| 2,286,428 | Mehler | June 16, 1942 |
| 2,427,106 | Landon | Sept. 9, 1947 |
| 2,444,060 | Ohl | June 29, 1948 |
| 2,447,543 | Smullin | Aug. 24, 1948 |
| 2,457,601 | Ring | Dec. 28, 1948 |
| 2,493,706 | Washburne et al. | Jan. 3, 1950 |
| 2,532,157 | Evans | Nov. 28, 1950 |